United States Patent
Li

(10) Patent No.: US 10,069,698 B2
(45) Date of Patent: Sep. 4, 2018

(54) FAULT-TOLERANT MONITORING APPARATUS, METHOD AND SYSTEM

(71) Applicant: FUJITSU LIMITED, Kawasaki-shi, Kanagawa (JP)

(72) Inventor: Michael Li, Hayes (GB)

(73) Assignee: FUJITSU LIMITED, Kawasaki (JP)

( * ) Notice: Subject to any disclaimer, the term of this patent is extended or adjusted under 35 U.S.C. 154(b) by 194 days.

(21) Appl. No.: 14/254,313

(22) Filed: Apr. 16, 2014

(65) Prior Publication Data

US 2015/0032877 A1 Jan. 29, 2015

(30) Foreign Application Priority Data

Jul. 23, 2013 (EP) ..................................... 13177709

(51) Int. Cl.
*H04L 12/26* (2006.01)
*G06F 11/30* (2006.01)

(52) U.S. Cl.
CPC .......... *H04L 43/08* (2013.01); *G06F 11/3006* (2013.01); *G06F 11/3058* (2013.01); *G06F 11/3096* (2013.01)

(58) Field of Classification Search
CPC ..... H04L 67/1002; H04L 29/06; H04L 67/10; H04L 69/329; H04L 67/1097;
(Continued)

(56) References Cited

U.S. PATENT DOCUMENTS 7,181,574 B1 * 2/2007 Lele ...................... G06F 11/203
711/137
9,336,044 B2 5/2016 Takeshita
(Continued)

FOREIGN PATENT DOCUMENTS

WO WO 2009/030028 A1 3/2009
WO WO 2012/026041 A1 3/2012

OTHER PUBLICATIONS

S. Narravula et al. "Designing Efficient Cooperative Caching Schemes for Multi-Tier Data-Centers over RDMA-enabled Networks" Mar. 4, 2006 Ohio State Department of Computer Science and Engineering—All pages are pertinent. http://nowlab.cse.ohio-state.edu/static/media/publications/abstract/narravul-ccgrid06.pdf.*

(Continued)

*Primary Examiner* — Patrice L Winder
*Assistant Examiner* — Abderrahmen Chouat
(74) *Attorney, Agent, or Firm* — Staas & Halsey LLP

(57) ABSTRACT

A fault-tolerant monitoring apparatus is arranged to monitor physical performance properties of a plurality of networked computing elements, each element including a processing unit and individual memory. The monitoring apparatus comprises a plurality of measurer apparatuses, each arranged to measure the physical performance properties of a single computing element, the physical performance properties being stored as local information in the individual memory of the computing element in which the measurement is made; and one or more collector apparatuses arranged to control collection of remote information representing physical performance properties from individual memory in a plurality of the computing elements; and storage of the remote physical performance information as replicate information in the individual memory of another computing element; wherein the remote physical performance information is collected using third party access.

15 Claims, 9 Drawing Sheets

(58) Field of Classification Search
CPC .............. H04L 67/1008; H04L 67/2842; H04L 61/1511; H04L 41/0893; H04L 67/1095; H04L 41/12; H04L 67/16; H04L 67/42; H04L 67/28; G06F 9/5072; G06F 15/173; G06F 9/5055; G06F 9/505; G06F 15/177; G06F 3/067; G06F 17/30575; G06F 9/5061; G06F 9/5027; G06F 11/2097; H04N 21/23103; H04N 21/47202; H04N 21/2405
USPC ....... 709/224, 226, 219, 203, 223, 204, 217, 709/221, 202, 213, 220, 201, 212, 245, 709/238; 726/1, 3; 707/737, 741, 634, 707/610, 769, 722; 370/329, 235, 254
See application file for complete search history.

(56) References Cited

U.S. PATENT DOCUMENTS

| | | | | |
|---|---|---|---|---|
| 2001/0042073 | A1* | 11/2001 | Saether | G06F 17/30194 |
| 2003/0002436 | A1* | 1/2003 | Anderson | H04L 12/2602 370/218 |
| 2005/0251564 | A1* | 11/2005 | Tillotson | G06F 11/2294 709/218 |
| 2007/0041383 | A1* | 2/2007 | Banikazemi | H04L 67/06 370/395.3 |
| 2010/0214216 | A1* | 8/2010 | Nasiri | A63F 13/06 345/158 |
| 2010/0235490 | A1* | 9/2010 | Nasnas | H04L 43/04 709/224 |
| 2011/0087767 | A1* | 4/2011 | Sonkin | G06F 9/44505 709/224 |
| 2011/0087908 | A1 | 4/2011 | Færevaag | |
| 2012/0278422 | A1* | 11/2012 | Oliver | G06F 9/4843 709/212 |
| 2012/0311147 | A1* | 12/2012 | Keskitalo | H04W 24/10 709/224 |
| 2014/0359634 | A1* | 12/2014 | Arao | G06F 9/5011 718/104 |

OTHER PUBLICATIONS

P. Balaji et al., "Exploiting Remote Memory Operations to Design Efficient Reconfiguration for Shared Data-Centers over InfiniBand" *Workshop on Remote Direct Memory Access (RDMA,)* 2004, pp. 1-10.

K. Vaidyanathan et al., "Exploiting RDMA Operations for Providing Efficient Fine-Grained Resource Monitoring in Cluster-based Servers," *Workshop on Remote Direct Memory Access (RDMA,)* 2006, pp. 1-10.

"Triple Voltage Monitor with Integrated CPU Supervisor (Data Sheet FN8114.2,)" Intersil, Aug. 2008, pp. 1-23.

T. Do et al., "pTop: A Process-level Power Profiling Tool," *Proceedings of the 2nd Workshop on Power Aware Computing and Systems (HotPower'09)*, Oct. 2009, 5 pages.

"A Look at the Market for Environmental Monitoring Equipment," *Processor*, url:http://www.processor.com/editorial/article. asp?article=articles%2Fp3116%2F70p16%2F70p16.asp, vol. 31, No. 16, Jun. 2009 (retrieved May 4, 2010,) 5 pages.

Extended European Search Report dated Jan. 28, 2014 in corresponding European Patent Application No. 13177709.6-1960.

Japanese Notification of Reasons for Refusal dated Jan. 30, 2018 in related Japanese Patent Application No. 2014-092962 (4 pages) (3 pages English Translation).

* cited by examiner

Prior Art: RAID

Embodiments: Get-only Retrieval

Prior Art: iSCSI Extensions for RDMA (iSER)

Embodiments: Distributing Monitoring Data iSCSI Extensions for RDMA: Read

Proposal for Reading iSCSI Extensions for RDMA: Write

Proposal for Writing

FAULT-TOLERANT MONITORING APPARATUS, METHOD AND SYSTEM

CROSS-REFERENCE TO RELATED APPLICATIONS

This application claims the benefit of European Application No. 13177709.6, filed Jul. 23, 2013, the disclosure of which is incorporated herein by reference.

BACKGROUND

1. Field

The present invention relates to fault-tolerant monitoring of networked computing elements. As computing systems grow increasingly large and complex, there is an increased risk that monitoring of a system may be disrupted by faults in individual computing elements. Fault-tolerant monitoring can be useful in a wide range of application areas, for example from simple computations to sensor networks, image rendering and large-scale, complex simulations, including on-the-fly and offline processing. As some important examples, mission-critical jobs (e.g. operational weather forecasting) or systems (e.g. the internet) with very many computing elements can benefit from fault-tolerant monitoring. This invention addresses the whole gamut of these application areas, and is focused particularly on distributed, parallel computer programs running on very large high-performance computing systems with data distributed over a number of CPUs.

2. Description of the Related Art

One example of such a distributed parallel application is simulation. In many simulations, an iterative computation or iterative sets of computations are carried out, each computation corresponding to a single element in the situation. Simulations elements may be linked in that a computation for one element of the simulation may require values from other elements of the simulation, so that data transfer between processes carrying out the simulation is considerable. Monitoring of a system carrying out such a simulation or other computational application can allow identification of not only computing elements which are faulty but also of computing elements which are overloaded and/or consume excessive amounts of energy. However, once a computing element has failed it may be impossible to recover the data.

Computationally intense applications are usually carried out on high performance computer systems. Such high performance computer (HPC) systems often provide distributed environments in which there is a plurality of processing units or cores each with its own individual memory and on which processing threads of an executable can run autonomously in parallel.

Many different hardware configurations and programming models are applicable to high performance computing. A popular approach to high-performance computing currently is the cluster system, in which a plurality of nodes each having one or more multicore or single core processors (or "chips") are interconnected by a high-speed network. Each node is assumed to have its own area of memory, which is accessible to all cores within that node. The cluster system can be programmed by a human programmer who writes source code, making use of existing code libraries to carry out generic functions. The source code is then compiled (or compiled and then assembled) to lower-level executable code. The executable form of an application (sometimes simply referred to as an "executable") is run under supervision of an operating system (OS).

The latest generation of supercomputers contain hundreds of thousands or even millions of cores. The three systems on the November 2012 TOP500 list with sustained performance over 10 Pflop/s contain 560,640 (Titan), 1,572,864 (Sequoia) and 705,024 (K computer) cores. In moving from petascale to exascale, the major performance gains will result from an increase in the total number of cores in the system (flops per core is not expected to increase) to 100 million or more. As the number of nodes in the system increases (and especially if low-cost, low-energy nodes are used to maintain an acceptable power envelope) the mean-time-to-component-failure of the system will decrease—eventually to a time shorter than the average simulation run (or other application execution) on the system. Hence, it will be necessary for monitoring of exascale software to be resilient to component failure.

The general principle for fault-tolerant provision of data is redundant storage of data to ensure that in the event of a fault, the data is still available from elsewhere. This principle is used in RAID (Redundant Array of Independent Discs), and could be used in conjunction with iSER (iSCSI extensions for RDMA, Remote Direct Memory Access) for data retrieval.

RAID is an umbrella term for computer data storage schemes that can divide and replicate data among multiple physical drives, such as discs. The array of discs can be accessed by the operating system as one single disc. Effectively, this technology primarily addresses large files which benefit from "striping" across discs. This method of "striping" files across discs can be used to aid fault-tolerant data provision. iSER is a computer network protocol that extends the internet small computer system interface (iSCSI) protocol to use RDMA. It permits data to be transferred directly into and out of SCSI computer memory buffers without intermediate data copies.

Remote Direct Memory Access is a technology allowing a computing element to use its network interface controller (or other network access mechanism) to transmit information via the network to modify the storage at a second computing element. This technology is important in high performance computing, where the computing elements may be part of a supercomputer, as it reduces the work placed on the processor of the computing element. RDMA technology is also beneficial to a network-on-chip processor as a computing element in the network is able to modify storage local to a second computing element in a way that minimizes the work placed on the second computing element.

RDMA relies on single-sided communication, also referred to as "third-party I/O" or "zero copy networking". In single-sided communication, to send data, a source processor or initiator (under control of a program or process being executed by that processor) simply puts that data in the memory of a destination processor or target, and likewise a processor can read data from another processor's memory without interrupting the remote processor. Thus, the operating system of the remote processor is normally not aware that its memory has been read or written to. The writing or reading are handled by the processors' network interface controllers (or equivalent, e.g. network adapter) without any copying of data to or from data buffers in the operating system (hence, "zero copy"). This reduces latency and increases the speed of data transfer, which is obviously beneficial in high performance computing.

Consequently, references in this specification to data being transferred from one computing element or node to another should be understood to mean that the respective network interface controllers (or equivalent) transfer data, without necessarily involving the host processing units of the nodes themselves.

Conventional RDMA instructions include "rdma_put" and "rdma_get". An "rdma_put" allows one node to write data directly to a memory at a remote node, which node must have granted suitable access rights to the first node in advance, and have a memory (or buffer) ready to receive the data. "rdma_get" allows one node to read data directly from the memory (or memory buffer) of a remote node, assuming again that the required privileges have already been granted.

It is desirable to provide monitoring for network computing elements which is fault-tolerant.

SUMMARY

Additional aspects and/or advantages will be set forth in part in the description which follows and, in part, will be apparent from the description, or may be learned by practice of the invention.

According to one embodiment of a first aspect of the invention there is provided a fault-tolerant monitoring apparatus arranged to monitor physical performance properties of a plurality of networked computing elements, each element including a processing unit and individual memory, the monitoring apparatus including a plurality of measurer apparatuses, each arranged to measure the physical performance properties of a single computing element, the physical performance properties being stored as local information in the individual memory of the computing element in which the measurement is made; and one or more collector apparatuses arranged to control collection of remote information representing physical performance properties from individual memory in a plurality of the computing elements; and storage of the remote physical performance information as replicate information in the individual memory of another computing element; wherein the remote physical performance information is collected using third party access.

By provision of a monitoring apparatus with a plurality of measurer apparatuses, one for each computing element and at least one collector apparatus which redistributes information from individual memory of computing elements into a different computing element using third party access, monitoring data can be stored in a way which allows it to be accessed even if one of the computing elements fails.

The advantage of third party access in this aspect is that the computing element from which the remote information is collected is not involved in the collection process and thus collection can continue even if the computing element is faulty. Third party access is able to tolerate a wide variety of faults on the remote computing element, such as on-chip faults in registers or execution units.

Reference herein to physical performance properties is to physical, usually electrical characteristics such as voltage, current, power and energy use of the computing element or part thereof.

Further characteristics include transmission characteristics, possibly in the form of network metrics such as delay/latency, packet loss, retransmission and throughput to and/or from the computing element.

Thus this aspect of the invention refers primarily to physical performance properties, but a fault-tolerant monitoring apparatus may also monitor data performance properties, such as CPU performance metrics (cycles used, instructions committed, floating operations performed, stalled cycles, integer operations performed, cache hits and misses and TLB hits and misses; and/or memory performance metrics (latency, read/write throughput MB/s, number of page faults). Such data performance properties may be written to individual memory when an application includes self monitoring.

Accordingly, in some embodiments, the one or more collector apparatuses are also arranged to control collection of remote information representing data performance properties from individual memory in the plurality of computing elements and to control storage of the remote data performance information as replicate information in the individual memory of the other computing element. The remote data performance information may also be collected using third party access.

As an aside, the fault-tolerant monitoring apparatus may not be involved when the application writes self monitoring information to individual memory, but become involved only later in collecting this type of information for replicate storage.

Any suitable technology can be used in the measurer apparatus to read physical performance properties. In one embodiment, each measurer apparatus includes probe or sampling resistors to estimate one or more of: voltage; current; power; or energy supplied to one or more components of the computing element.

The individual memory present in each computing element can be any suitable type of memory, but in many embodiments is volatile memory such as pinned RAM (which cannot be swapped out to another memory location) or RAM or a cache memory. If "non-pinned" RAM is used, the third party access may be adapted to arrange for the correct location to become available. Cache memory is usually faster than RAM and closer to CPU cores, so may be a good alternative to either form of RAM.

The third party access is also possible by any known method, including remote direct memory access RDMA put and/or remote direct memory access RDMA get.

Although a measurer apparatus may be provided for every computing element in a network of computing elements and usually a plurality of collector apparatuses will also be provided, all these separate components need not be switched on. For example, only collector apparatuses used in a computing element assigned to an executing application may be switched on. However, some applications may not use all assigned computing elements (typically the application will use all assigned nodes but some nodes may be left unused either by design, e.g. for redundancy, or unintentionally, e.g. by user error or due to the minimum allocation units permitted by the system). Thus only the apparatuses currently used in an application may be switched on. In one embodiment, the monitoring apparatus is controlled to switch on a collector apparatus or a measurer apparatus, in accordance with the computing elements currently used in an application.

Further, even if there is more than one collector apparatus, not necessarily every collector apparatus will be used to collect remote information. For example the monitoring apparatus may be controlled to activate collection by a subset of the collector apparatuses (or a sub-set of the collector apparatuses currently used in an application), the replicate information thus being stored in a subset of computing elements.

Each collector apparatus carrying out collection will provide a set of replicate information, for example from all the nodes used in an application. However a collector apparatus may be switched on but not activated for collection, for example if it carries out other roles as will be explained in more detail later.

The invention can be applied to any network of computing elements however closely or loosely linked, the aspects simply being two or more CPUs or other processing units, two or more corresponding memory locations and for connection purposes two or more connection means such as network interface controllers. Thus the invention is applicable to "resource pool architecture" (in brief, pools of hardware components such as CPUs and discs provided and linked together dynamically by high-speed networks). In this case there may be one FTMC apparatus (with one collector) for every four to ten CPUs.

However a plurality of nodes with distributed memory is probably a more typical embodiment. Therefore, in many embodiments the plurality of networked computing elements forms a single computer system or cluster, the computing elements acting as nodes, each node including a processing unit in the form of at least one CPU, individual memory as RAM memory and a network interface controller to link to the network.

In this type of system, the monitoring apparatus may include a measurer apparatus for each node and a plurality of collector apparatuses, each collector apparatus shared between a group of the nodes, and arranged to collect remote information within its group of nodes and for nodes of other groups. Of course, not every collector apparatus need be activated for collection as mentioned above.

Each collector apparatus may be shared between a plurality of nodes and linked to each of these nodes via the network interface controller. One collector apparatus may be provided per "drawer" or system board in the system, or several drawers may share a collector apparatus. Each measurer apparatus may monitor one or more of the network interface, individual memory and CPU in its node. Each measurer apparatus may be directly linked to a single collector apparatus.

Not all of the nodes (and thus not all of the measurer apparatuses) are necessarily used within any application. For this and other reasons the monitoring apparatus can be controlled to activate measurement by a sub-set of the measurer apparatuses. In one arrangement each of the measurer apparatuses activated is directly linked to a collector apparatus that is activated for collection. Thus where measurement takes place, the collector apparatus also stores remote information.

The skilled reader will appreciate that this embodiment can be combined with other embodiments so that a currently activated sub-set of the measurer apparatuses may be directly linked to collector apparatuses activated for collection to provide a lower number of replicates.

In an alternative arrangement, remote information is stored (at nodes) where there is no measurement so that the measurer apparatuses activated are not directly linked to activated collector apparatuses.

In either of these variants, the nodes in the subset may be monitored by different FTMC apparatus components which will function as one FTMC apparatus for the duration of the monitoring (in the same way as the nodes are individual computers but function together as one computer when a parallel application is running).

For a fixed replication strategy the number of replicates of data will be the same whether replicate monitoring data is held on monitored nodes or non-monitored nodes. The difference between monitoring data being held on the monitored nodes and monitoring data being held on different non-monitored nodes is that for the latter option the remote data storage location is separated from all the local data. Thus failures of these locations will not be correlated so that more replicates will survive. This is not the primary reason for choosing this variant: lower monitoring overhead is a better reason. Overhead is lower as monitored RAM is not used both for local storage and for replicate storage. The usual arrangement of holding replicate data locally has the alternative advantage of employing otherwise unused resources (such as CPUs not involved in the computation).

The measurer apparatus can store its local information in individual memory (such as pinned RAM) without the collector apparatus having a role at this stage. However, in other embodiments, the measurer apparatus may have more of a control role, also with respect to the measurer apparatus. For example, in some embodiments the collector apparatus includes a controller and storage and the controller is operable to update the storage with data performance information from collector apparatuses with which it is directly linked (that is without the NIC) and to write information from the storage to the individual memories as location information using third party access.

The invention also extends to method aspects which may be combined with any of the foregoing apparatus aspects and any combination of sub-features thereof.

According to an embodiment of a method aspect there is provided a fault-tolerant monitoring method for monitoring physical performance properties of a plurality of networked computing elements, each element including a processing unit and individual memory, the monitoring method including measuring the physical performance properties of computing elements using measurer apparatuses and storing local information representing the physical performance properties in the individual memory of those computing elements; and collecting remote information representing physical performance properties from individual memory in a particular computing element using a collector apparatus and storing the remote physical performance information as replicate information in the individual memory of another computing element; wherein the remote physical performance information is collected using third party access.

In such a method, if a computing element fails or is otherwise deselected during execution of an application and an application continues or restarts from a check point and omitting the particular computing element, physical performance data for the particular computing element before failure can be provided by other computing elements in which the data was stored as replicate information.

According to an embodiment of a system aspect there is provided a computer system including a plurality of networked computing elements, each element including a processing unit and individual memory, the computer system also including a fault-tolerant monitoring apparatus arranged to monitor physical performance properties of the networked computing elements, the monitoring apparatus including a plurality of measurer apparatuses each arranged to measure the physical performance properties of a single computing element, for storage as local information in the individual memory of the particular computing element; and collector apparatus arranged to collect remote information representing physical performance properties from individual memory in a plurality of the computing elements and to store the remote physical performance information as replicate information in the individual memory of another computing element; wherein the remote physical performance information is collected using third party access.

Thus the monitored computing system includes the networked computing elements as previously defined and the fault-tolerant monitoring apparatus as previously defined.

According to a further aspect there is provided a program which when loaded onto a monitoring apparatus in a distributed memory computer system configures the computing apparatus to carry out the method steps according to any of the preceding method definitions or any combination thereof.

Features and sub-features of any of the different aspects of the invention may be freely combined. For example, preferred embodiments of the computer system may be configured to incorporate functionality corresponding to one or more preferred features of one or more of the apparatus aspects.

The invention can be implemented in computer hardware, firmware, software, or in combinations of them. The invention can be implemented as a computer program or computer program product, i.e., a computer program tangibly embodied in an information carrier, e.g., in a machine-readable storage device or in a propagated signal, for execution by, or to control the operation of, one or more hardware modules.

A computer program can be in the form of a computer program portion or more than one computer program and can be written in any form of programming language, including compiled or interpreted languages, and it can be deployed in any form, including as a stand-alone program or as a module, component, subroutine, or other unit suitable for use in a data processing environment. A computer program can be deployed to be executed on one module or on multiple modules at one site or distributed across multiple sites and interconnected by a communication network.

Method steps of the invention can be performed by one or more programmable processors executing a computer program to perform functions of the invention by operating on input data and generating output. Each processor may have one or more cores.

Processors suitable for the execution of a computer program include, by way of example, both general and special purpose microprocessors, and any one or more processors of any kind of digital or biological computer. Generally, a processor will receive instructions and data from a read-only memory or a random access memory or both. The essential elements of a computer are a processor for executing instructions coupled to one or more memory devices for storing instructions and data.

The invention is described in terms of particular embodiments. Other embodiments are within the scope of the following claims. For example, the steps of the invention can be performed in a different order and still achieve desirable results.

The apparatus according to preferred embodiments is described as configured, operable or arranged to carry out certain functions. This configuration or arrangement could be by use of hardware or middleware or any other suitable system. In preferred embodiments, the configuration or arrangement is by software.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
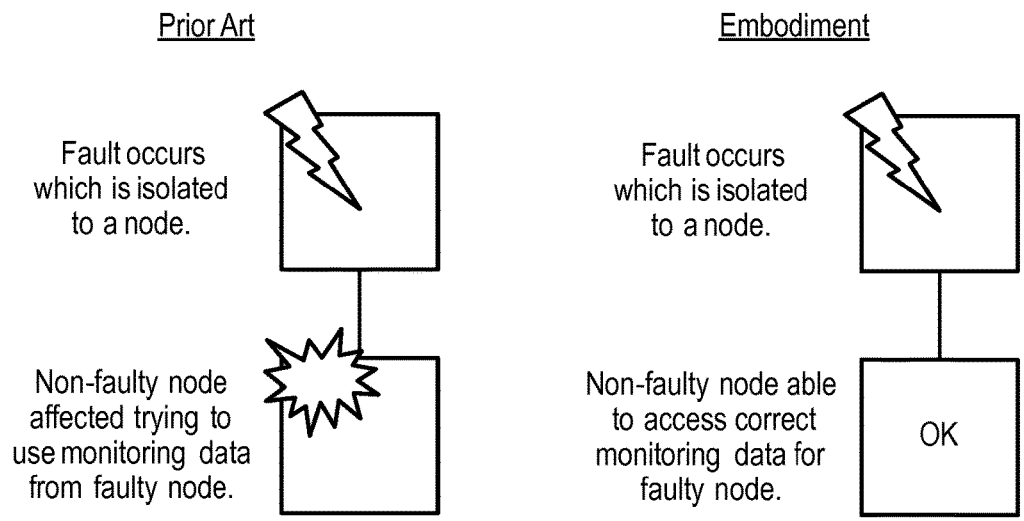
FIG. 1 is an overview diagram comparing prior art solutions with a representation of an invention embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a schematic representation of the effect of invention embodiments.

In the prior art methods of monitoring (left), if a fault occurs which is isolated to a node, then a functioning node attempting to use monitoring data from the faulty node is affected. In contrast, the right hand side of FIG. 1 shows the same node-isolated fault occurring but the non-faulty node is able to access correct monitoring data by the use of third party access before or after occurrence of the fault and/or by the use of replicate information stored at the non-faulty node or another node which is still accessible.

Figure 2:
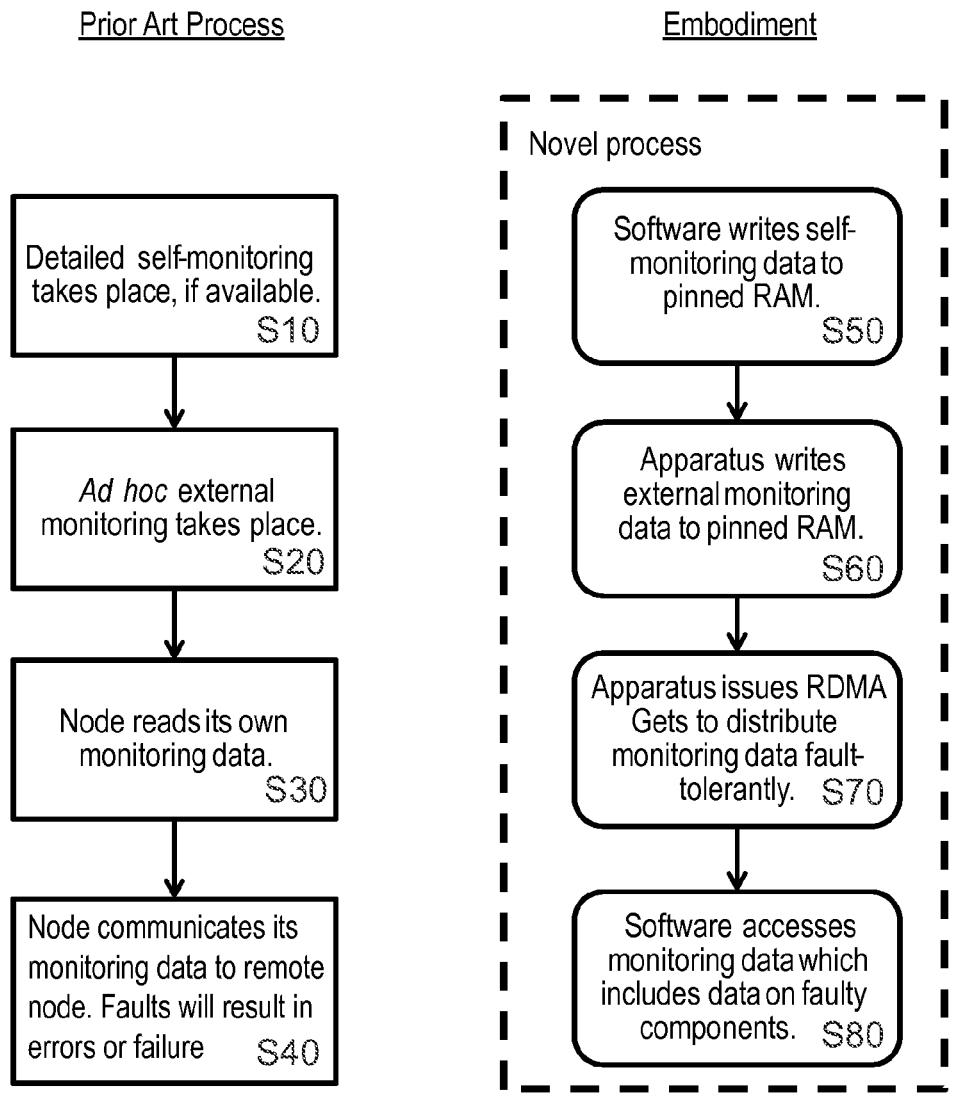
FIG. 2 is a flow chart comparison of a prior art method with an invention embodiment.

FIG. 2 shows a prior art process in a flow chart to the left and an invention embodiment in a flow chart to the right. In the prior art process, detailed self monitoring takes place if this is available in the application executing in step S10. In step S20 ad hoc external monitoring may take place.

In step S30, any node may read (that is store) its own monitoring data.

In step S40 the node can communicate its monitoring data to a remote node. Any faults will result in errors or failure.

According to an invention embodiment shown to the right of FIG. 2, the software writes any self-monitoring data to pinned RAM in step S50. The apparatus of invention embodiments, sometimes referred to as a Fault-Tolerant Measurer Collector (FTMC) apparatus writes external monitoring data (for example physical data useful for system operation) to pinned RAM in step S60. In step S70 the FTMC apparatus issues RDMA gets to distribute monitoring data fault-tolerantly.

In step S80 software, such as application or system utility software can access monitoring data including data on faulty components or nodes.

The right hand side of FIG. 2 is applicable to a plurality of collectors and a plurality of measurers. That is, FIG. 2 is the process for one FTMC apparatus (one collector and one or more measurers) but more importantly is also the process for when a plurality of FTMC apparatuses are working together as one FTMC apparatus (the usual operational case).

Figure 3:
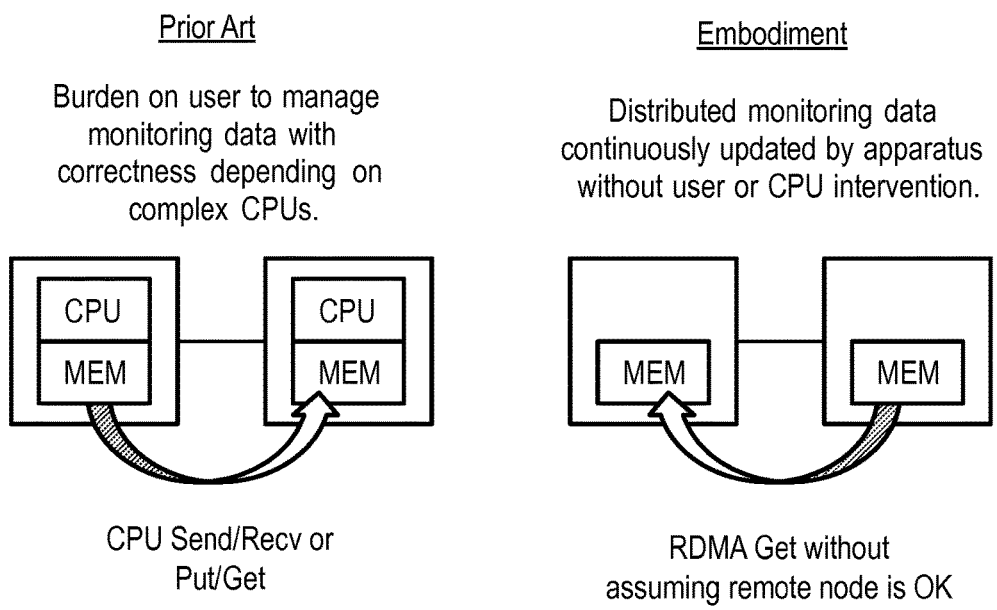
FIG. 3 is a further diagrammatic view comparing the prior art with invention embodiments.

FIG. 3 represents the way in which many prior art monitoring methods function on the left and on the right hand side of the figure, demonstrates how invention embodiments function.

In the prior art the CPU is involved in sending and receiving (putting/getting) monitoring data as mandated by the application currently executing. Thus there is a burden on the user (application programmer) to manage monitoring data and the correctness thereof depends on complex functioning of CPUs.

Conversely in the invention scenario shown to the right the CPU is no longer required for monitoring data because this function is carried out by the FTMC apparatus, without the need for user or CPU intervention. For example and as shown in FIG. 3 an RDMA get is used and there is no need to make any assumption that a remote node from which data is retrieved is functioning correctly.

Figure 4:
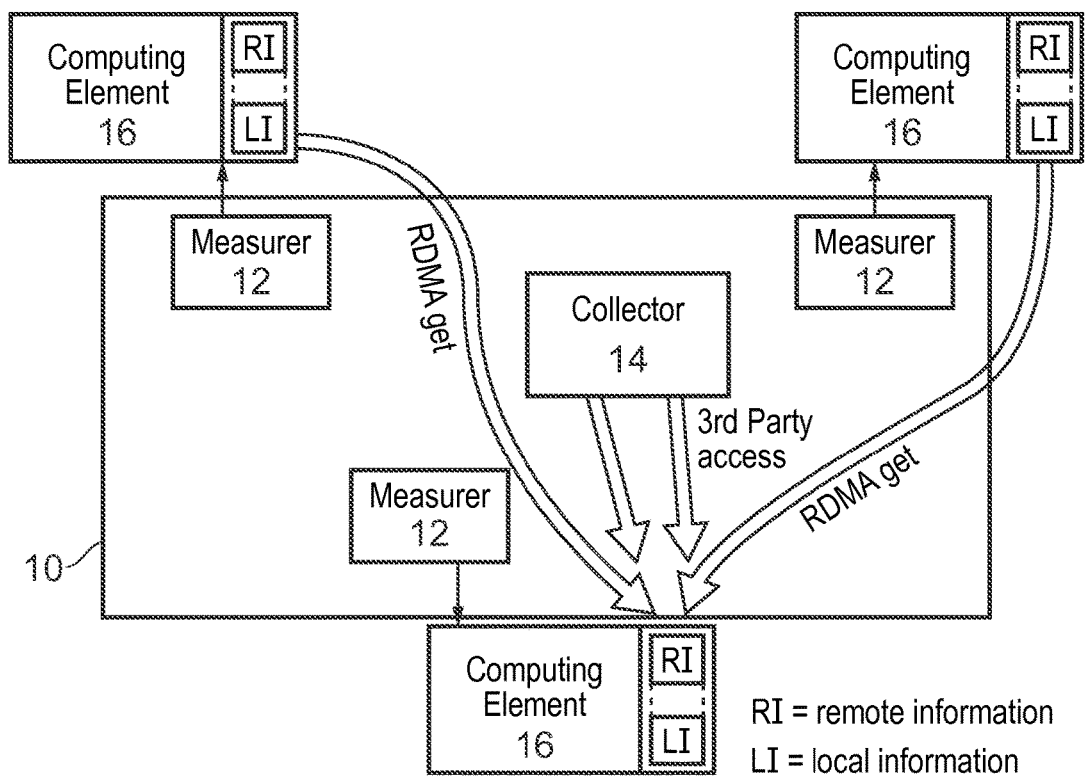
FIG. 4 is an apparatus overview of an invention embodiment in a network of computing elements.

FIG. 4 is an apparatus overview of an invention embodiment. The FTMC apparatus 10 is shown in this example as including three measurer apparatuses 12 and one collector apparatus 14. The various part of the FTMC apparatus are shown separately but they may be provided physically separate or together according to how the computer system or network is physically structured. FIG. 4 shows three computing elements 16, each with the ability to store remote information (RI) in its individual memory as well as local information (LI). The computing elements may each correspond to a node of a group of nodes served by the collector. FIG. 4 shows the use of RDMA gets to redistribute information. The collector uses third party access to store remote information in the two upper computing elements. A RDMA get acquires data from the target. In this example computing element 16 at the bottom of the figure is the target node and third party access allows local information in that computing element to be written up to the two computing elements at the top of the figure using RDMA gets.

Figure 5:
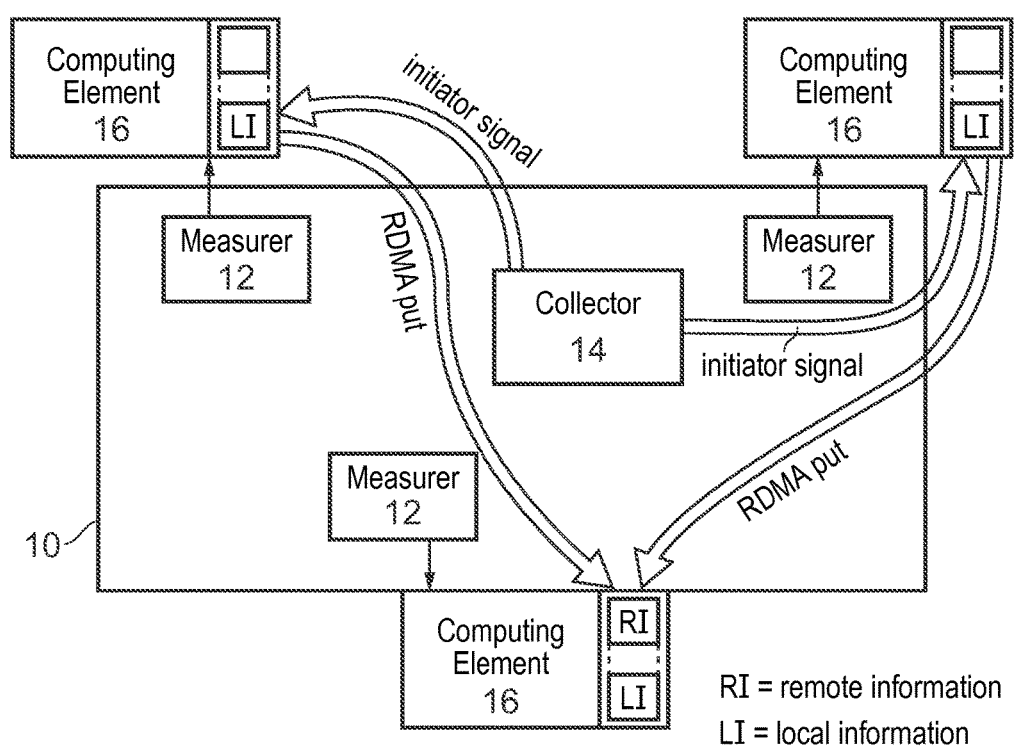
FIG. 5 is an apparatus overview of a variant of the FIG. 4 embodiment.

In contrast, FIG. 5 which shows the same physical arrangement, uses RDMA puts initiated by the collector. An RDMA put writes data to the target and thus in FIG. 5 remote information is collected in the computing element at the bottom of the figure.

FIGS. 4 and 5 only show some data replication, for simplicity, but remote data can be stored at any or all of the computing elements. Moreover, data from outside the group of nodes can be collected by use of third party access to other nodes (not shown).

For example, the FTMC Collector will issue RMDA Gets to the NIC which will read from nodes outside the drawer (and in the typical case, communication outside the node/drawer follows normal processes). In particular pre-orchestrated gathering of data will take place. Data location 30 shown in FIG. 6 (discussed later) is populated on initialization and this completely determines what gathering (for replication) takes place. A physical analogy would be a postman's list of pillar poxes to empty. Messages may be sent, from outside the drawer, to the FTMC Collector (the same collector which is reading from outside the drawer) to perform initialization of data locations 28 and 30 in FIG. 6 (if initialization does not occur on-node simply by running an executable which performs initialization again via the NIC).

Figure 6:
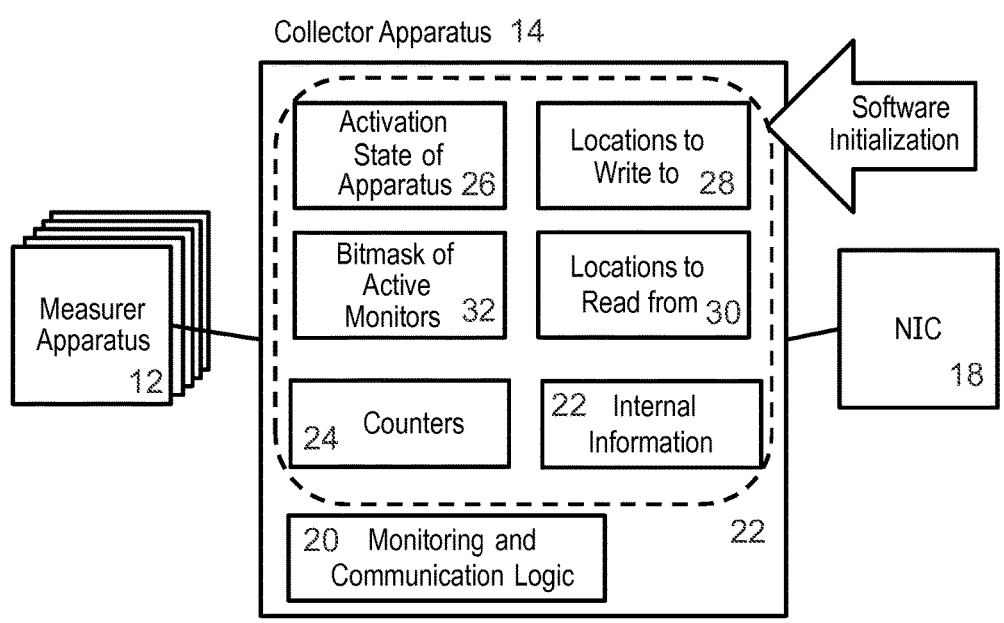
FIG. 6 is a schematic diagram of an FTMC apparatus according to invention embodiments.

FIG. 6 is a schematic diagram of a FTMC apparatus showing collector apparatus 14 linked to a plurality of measurer apparatuses 12 and NIC 18. The collector apparatus 14 includes monitoring and communication logic 20 and settings 22 including counters 24, the activation state of the apparatus 26, locations to write to 28, locations to read from 30 and a bitmask of active monitors 32. The bitmask simply indicates which kind of information is being monitored according to current settings.

The collector apparatus functions as follows. Software initializes the collector apparatus 14 by switching the activation state 26 to on (e.g. changing a bit from zero to one or setting an integer from an off value to a value corresponding to the appropriate version of the monitoring strategy or software). Software sets the bitmask of the monitors to be used 32. Initialization also zeroes the counter 24. Software sets the locations to write to 28 and locations to read from 20. The monitoring and communication logic (MCL) checks the activation state and sleeps if the collector is not active. If the apparatus is active, MCL updates the counters with data from a measurer apparatus (using direct communication, not the NIC). Periodically, MCL writes the counter information to pinned RAM using RMDA Puts (to some of the "Locations to Write to") through the NIC. Periodically, MCL performs RMDA Gets from the "Locations to Read from" and places this data In the remaining "Locations to Write to". The read locations may be local (for example within a group of nodes which the collector apparatus is servicing) or remote (for example outside the group). The process is repeated for other active measurer apparatuses.

Other behavior can be provided according to the activation state of the apparatus (e.g. external monitoring could be disabled so that the Counters are unused but self-monitoring may continue, other debugging schemes could be used such checking for failure of Measurer Apparatus and signaling this in some predetermined way such as writing known values in a software-determined location).

One detailed worked example demonstrating invention embodiments may be monitoring execution of an application running a 2D Finite Difference code for scalar diffusion where there is a grid of points one million by one million in size giving one trillion data points. Assuming the value at each point is a double precision floating point number (8 bytes, 64-bits), eight thousand gigabytes (8000 GB or 8 terabytes, 8 TB) of RAM are required. To carry out the computation more quickly, 1000 nodes are used which each hold a piece of the grid. Each node will also have "ghost points" which are required for computation but which the node is not responsible for updating and these points must be periodically updated during a communication phase which is not addressed further in this example. Additionally, 20 further nodes are provisioned in case some nodes fail. The user wishes to monitor the floating points computed (self-monitored) by the application and the energy used in Joules (measured externally) by the measurer apparatuses. Monitoring of these two characteristics is activated on all 1020 nodes with the instantaneous data periodically written to pinned RAM (i.e., which will not be swapped out to disk). Periodically this data is distributed amongst the 1020 nodes. At a certain point in time, one of the nodes fails and the application restarts from a "check-point" which has been written to disk. One of the reserve nodes is utilized to ensure there are 1000 nodes in the computation. Even after the node failure, full access to the monitoring data will be possible from any of the remaining active nodes.

A variation on this may be that the computation uses the monitoring data to see that one node is performing very poorly yet using a huge amount of energy and the computation may completely deactivate the poorly performing node so that the computation as a whole completes more quickly, uses less total electricity and therefore costs less in monetary terms.

Data independent of a faulty node is also useful in determining corrupt data. For example Node A may record a correct value of 10 for some monitor (monitored parameter). This value is replicated to Node B, Node C and Node D. Node B develops a fault so that an incorrect value of 23 is returned when queried but this can be discovered because Nodes C and D specify the correct value of 10. This is additional data independent of the faulty node. However this strategy does not help if Node A records an incorrect value of 32. If independent monitoring by FTMC measurers is available for this same monitor (e.g. energy usage), this external monitoring may have recorded a correct value of 10 at Node A which will be replicated to Nodes B, C and D. Effectively here, there is self monitoring and external monitoring of the same parameter for the same node. This gives a higher chance that the data will be available somewhere. In practice corrupt data is easily distinguishable from correct data so determining the correct value should not be difficult.

Figure 7:
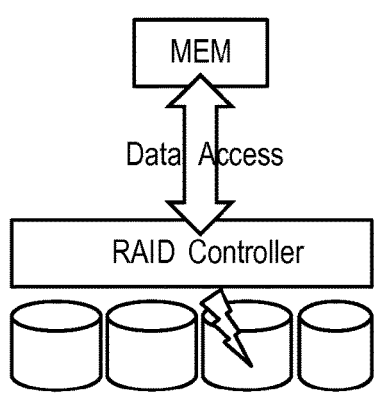
FIG. 7 is a comparison between RAID technology and the principle of invention embodiments.
Figure 7:
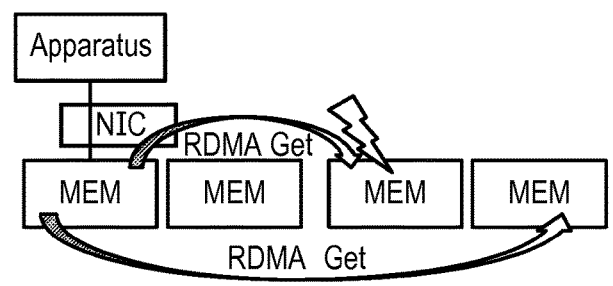

FIG. 7 shows to the left a diagrammatic explanation of the RAID technique and to the right the principle of invention embodiments.

According to the RAID method, a RAID controller is used to provide data access to memory stored across several discs or other drives. If one of the discs fails as shown, replicated information on the other discs can be used.

In invention embodiments, there is no need for a RAID controller and instead remote data is copied from a number of prearranged locations in remote memory using the NIC. Thus if one of the memory locations fails, as shown by the third memory block from the left in the right hand side of the figure, the memory block shown directly linked to the apparatus has access to monitoring data from the failed memory block, either from collection by RDMA get before failure or even after failure.

Figure 8:
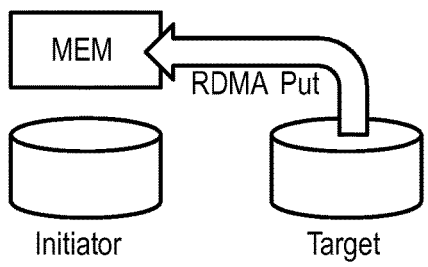
FIG. 8 is a comparison between use of iSER technology and the principle of invention embodiments.
Figure 8:
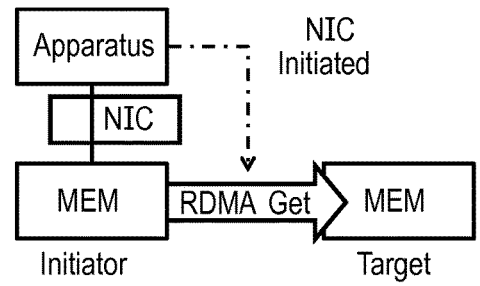
Figure 8:
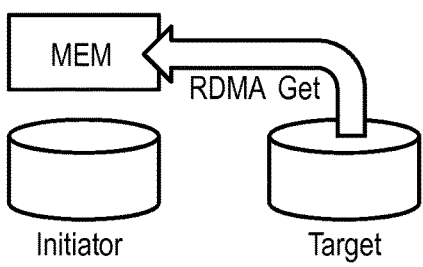
Figure 8:
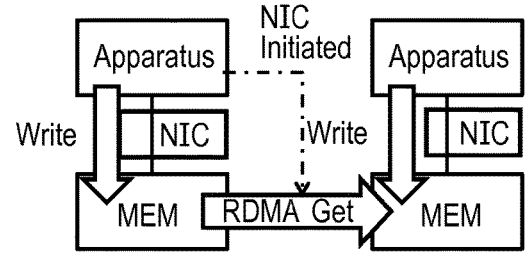

FIG. 8 shows read and write methodologies for iSER techniques used in RAID to the left of the figure and for invention embodiments to the right of the figure. Reading is shown in the upper half of the diagram. In iSER RDMA put is used to write from the target into the memory associated with the initiator. In contrast, according to invention embodiments a NIC initiated RDMA get reads data from the target to the initiator. As an aside, FIG. 8 shows use of an NIC to write to local memory in invention embodiments, but other methods are also possible, for example a NUMA (Non-Uniform Memory Access) arrangement or using Hyper-Transport or Intel QPI (Quick Path Interconnect).

Similarly, in write methodology the iSER technology uses a RDMA get to read from the target to the memory associated with the initiator. According to invention embodiments, the FTMC apparatus writes to memory associated with it, for example using RDMA put and RDMA get is used to read data from remote memory in the target.

Figure 9:
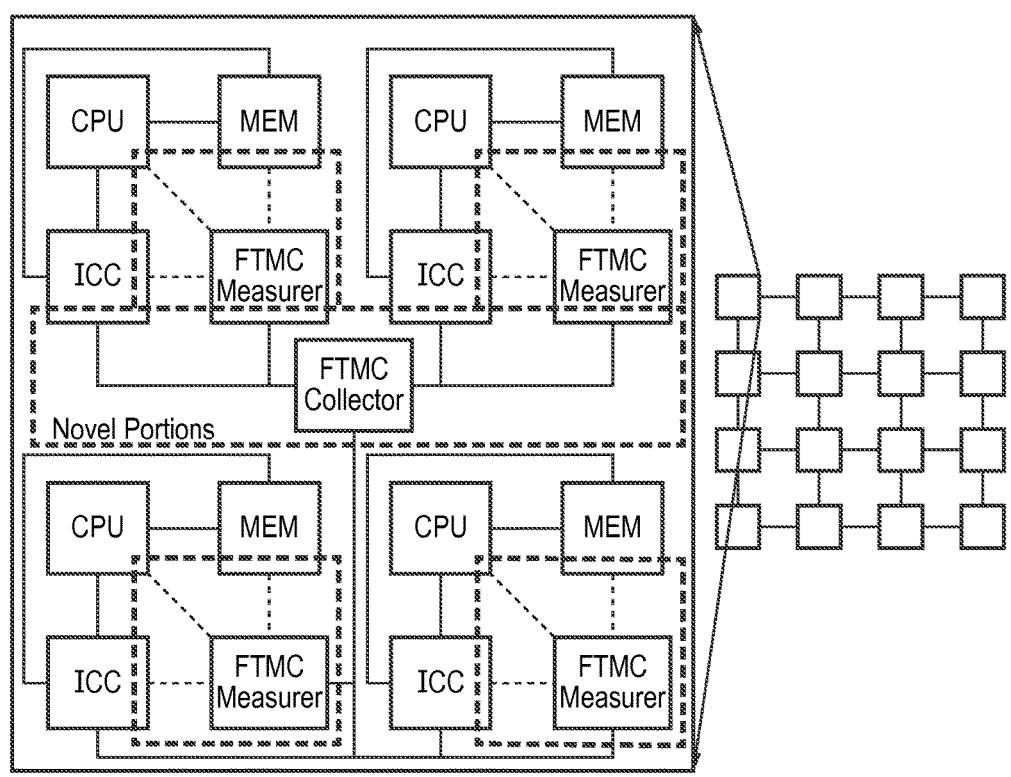
FIG. 9 shows components of an FTMC apparatus within a computer system.

FIG. 9 shows components of an FTMC apparatus within a computer system. The system shown is an interconnected cluster of 64 nodes in 16 drawers. One system board is magnified to show 4 nodes in that drawer. The nodes shown are single CPU nodes. However there may be multi socket nodes with a plurality of CPUs preferably with floating point accelerators. Solid lines between the CPU, memory (MEM), interconnect controller or NIC (ICC here) and the FTMC collector represents by directional interactions. Dotted lines from the FTMC measurer represent monitoring. Novel portions are enclosed in dashed lines. The components of the FTMC apparatus are shaded in.

As the skilled reader will appreciate the components shown for a single drawer may be part of a single FTMC apparatus which has components in each drawer of the system.

The Fault-Tolerant Measurer Collector (FTMC) apparatus and method of this embodiment will monitor characteristics such as voltage and energy usage of components of interest and provide this monitoring data to other nodes of the cluster even in the event of faults. Components with additional self-monitoring capabilities, such as monitoring floating point operations performed or packets sent, will be manipulated by the FTMC apparatus and software to provide fault-tolerant access to the data collected.

The monitoring data of the current invention embodiments may consist of a small collection of integer values which may be stored in 64-bits to 128-bits. A subset of nodes in the HPC system can be monitored and a subset of nodes may be chosen to hold the monitoring data. The monitoring data can be replicated across all the nodes chosen to hold the monitoring data or there may be a reduced number of replicates chosen (e.g. every second data-holding node, or every fourth data-holding node) and these locations may be communicated to the apparatus.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A fault-tolerant monitoring apparatus arranged to monitor physical performance properties of a plurality of networked computing elements, each computing element comprising a processing unit and individual memory to store local information from the computing element itself and remote information from other computing elements, the monitoring apparatus comprising a plurality of measurer apparatuses, each arranged to measure the physical performance properties of a single computing element among the plurality of computing elements, the physical performance properties being stored as local information in the individual memory of the single computing element in which the measurement is made; and at least one collector apparatus, each measurer apparatus, among the plurality of measurer apparatuses, being directly linked to a single collector apparatus among the at least one collector apparatus without involvement of a network interface controller to signal the collector apparatus with local information, each collector apparatus arranged to control, collection of remote information representing the physical performance properties from the individual memory in a plurality of the computing elements, and storage of the remote information as replicate information in the individual memory of another computing element;

wherein the remote information is collected by a computing element other than the computing element from which the remote information is collected using third party access, and the remote information is stored as replicate information in the individual memory of the computing element which collected the remote information, or another computing element other than a computing element from which the remote information is collected using the third party access;

wherein the physical performance properties are in form of electrical characteristics including any of voltage, current power or energy use of the computing element or part thereof; and wherein the third party access is by one of remote direct memory access (RDMA) put and RDMA get.

2. A monitoring apparatus according to claim 1, wherein the at least one collector apparatus is further arranged to control collection of remote data information representing the data performance properties from the individual memory in the plurality of computing elements by a computing element other than a computing element from which the remote data information is collected and storage of the remote data information as replicate data information in the individual memory of the computing element, which collected the remote data information, or another computing element other than the computing element from which the remote data information is collected; and wherein the remote data information is collected using third party access.

3. A monitoring apparatus according to claim 1, wherein at least one measurer apparatus among the plurality of measurer apparatuses includes resistors to estimate one or more of: voltage, current, power, and energy supplied to one or more components of the single computing element.

4. A monitoring apparatus according to claim 1, wherein the individual memory is volatile memory, comprising pinned RAM, RAM and a cache memory.

5. A monitoring apparatus according to claim 1, wherein the monitoring apparatus is controlled to switch on any one of the at least one collector apparatus and at least one measurer apparatus among the plurality of measurer apparatuses, in accordance with the computing elements currently used in an application.

6. A monitoring apparatus according to claim 1, wherein the at least one collector apparatus is more than one collector apparatus and wherein the monitoring apparatus is controlled to activate collection by a subset of the collector apparatuses, the replicate information being stored in a subset of the computing elements.

7. A monitoring apparatus according to claim 1, wherein the plurality of networked computing elements forms a single computer system, the computing elements acting as nodes, each node comprising the processing unit in a form of at least one CPU, the individual memory as RAM memory and the network interface controller to link to the network.

8. A monitoring apparatus according to claim 7, wherein the monitoring apparatus comprises the plurality of measurer apparatuses for each node and the at least one collector apparatus is more than one collector apparatus, each collector apparatus shared between a group of nodes, and arranged to collect the remote information within the group of nodes and from nodes of other groups.

9. A monitoring apparatus according to claim 8,
wherein each collector apparatus shared between the group of nodes is linked to each node of the group of nodes via the network interface controller, and
wherein each measurer apparatus monitors one or more of the network interface controller, the individual memory and the CPU in a corresponding node and is directly linked to a single collector apparatus.

10. A monitoring apparatus according to claim 9, wherein the monitoring apparatus is controlled to activate measurement by a subset of the measurer apparatuses, and wherein the measurer apparatuses activated are directly linked to activated collector apparatuses.

11. A monitoring apparatus according to claim 9, wherein the at least one collector apparatus includes a controller and storage and the controller is operable to update the storage with data performance information from the measurer apparatuses with which the at least one collector apparatus is directly linked and to write information from the storage to the individual memory of the computing element to which the remote information is stored as location information using third party access.

12. A fault-tolerant monitoring method for monitoring physical performance properties of a plurality of networked computing elements, each computing element including a processing unit and an individual memory to store local information from the computing element itself and remote information from other computing elements, the monitoring method comprising
measuring the physical performance properties of corresponding computing elements using measurer apparatuses and storing local information representing the physical performance properties in the individual memory of the corresponding computing elements; and
by at least one collector apparatus,
collecting remote information representing the physical performance properties from the individual memory in a particular computing element among the computing elements, and
storing the remote information as replicate information in the individual memory of another computing element;
wherein each measurer apparatus, among the measurer apparatuses, is directly linked to a single collector apparatus among the at least one collector apparatus without involvement of a network interface controller to signal the collector apparatus with local information;
wherein the remote information is collected by a computing element other than the computing element from which the remote information is collected using third party access, and the remote information is stored as replicate information in the individual memory of the computing element which collected the remote information, or another computing element other than the computing element from which the remote information is collected, using the third party access;
wherein the physical performance properties are in form of electrical characteristics including any of voltage, current, power or energy use of the computing element or part thereof; and
wherein the third party access is by one of remote direct memory access (RDMA) put and RDMA get.

13. A method according to claim 12, wherein the particular computing element either fails, or is deselected during execution of an application; and
the application either restarts from a checkpoint, or continues, omitting the particular computing element,
wherein the physical performance data for the particular computing element before failure is provided by the other computing element in which the remote information representing the physical performance data was stored as the replicate information.

14. A non-transitory computer-readable medium tangibly embodying a computer program, which when loaded onto a distributed memory computer system with a plurality of networked computing elements, each computing element including a processing unit and an individual memory to store local information from the computing element itself and remote information from other computing elements, configures the distributed memory computer system to:
measure physical performance properties of corresponding computing elements using measurer apparatuses and store local information representing the physical performance properties in individual memory of the corresponding computing elements; and
using at least one collector apparatus, collect remote information representing the physical performance properties from the individual memory in a particular computing element among the computing elements, and store the remote information as replicate information in the individual memory of another computing element;

wherein each measurer apparatus, among the measurer apparatuses, is directly linked to a single collector apparatus among the at least one collector apparatus without involvement of a network interface controller to signal the collector apparatus with local Information;

wherein the remote information is collected by a computing element other than the computing element from which the remote information is collected using third party access, and the remote information is stored as replicate information in the individual memory of the computing element which collected the remote information, or another computing element other than the computing element from which the remote information is collected, using the third party access;

wherein the physical performance properties are in form of electrical characteristics including any of voltage, current, power or energy use of the computing element or part thereof; and wherein the third party access is by one of remote direct memory access (ROMA) put and RDMA get.

15. A computer system comprising a plurality of networked computing elements, each computing element including a processing unit and individual memory to store local information from the computing element itself and remote information from other computing elements, the computer system including a fault-tolerant monitoring apparatus arranged to monitor physical performance properties of the networked computing elements, the monitoring apparatus comprising:

a plurality of measurer apparatuses each arranged to measure the physical performance properties of a single computing element among the plurality of computing elements, for storage as local information in the individual memory of the particular single computing element; and at least one collector apparatus, each measurer apparatus, among the plurality of measurer apparatuses, being directly linked to a single collector apparatus among the at least one collector apparatus without involvement of a network interface controller to signal the collector apparatus with local information;

each collector apparatus arranged to control, collection of remote information representing the physical performance properties from individual memory in a plurality of the computing elements, and storage of the remote information as replicate information in the individual memory of another computing element;

wherein the remote information is collected by a computing element other than the computing element from which the remote information is collected using third party access, and the remote information is stored as replicate information in the individual memory of the computing element which collected the remote Information, or another computing element other than the computing element from which the remote information is collected, using the third party access;

wherein the physical performance properties are in form of electrical characteristics including any of voltage, current, Dower or energy use of the computing element or part thereof; and wherein the third party access is by one of remote direct memory access (RDMA) put and RDMA get.

* * * * *